Patented June 12, 1934

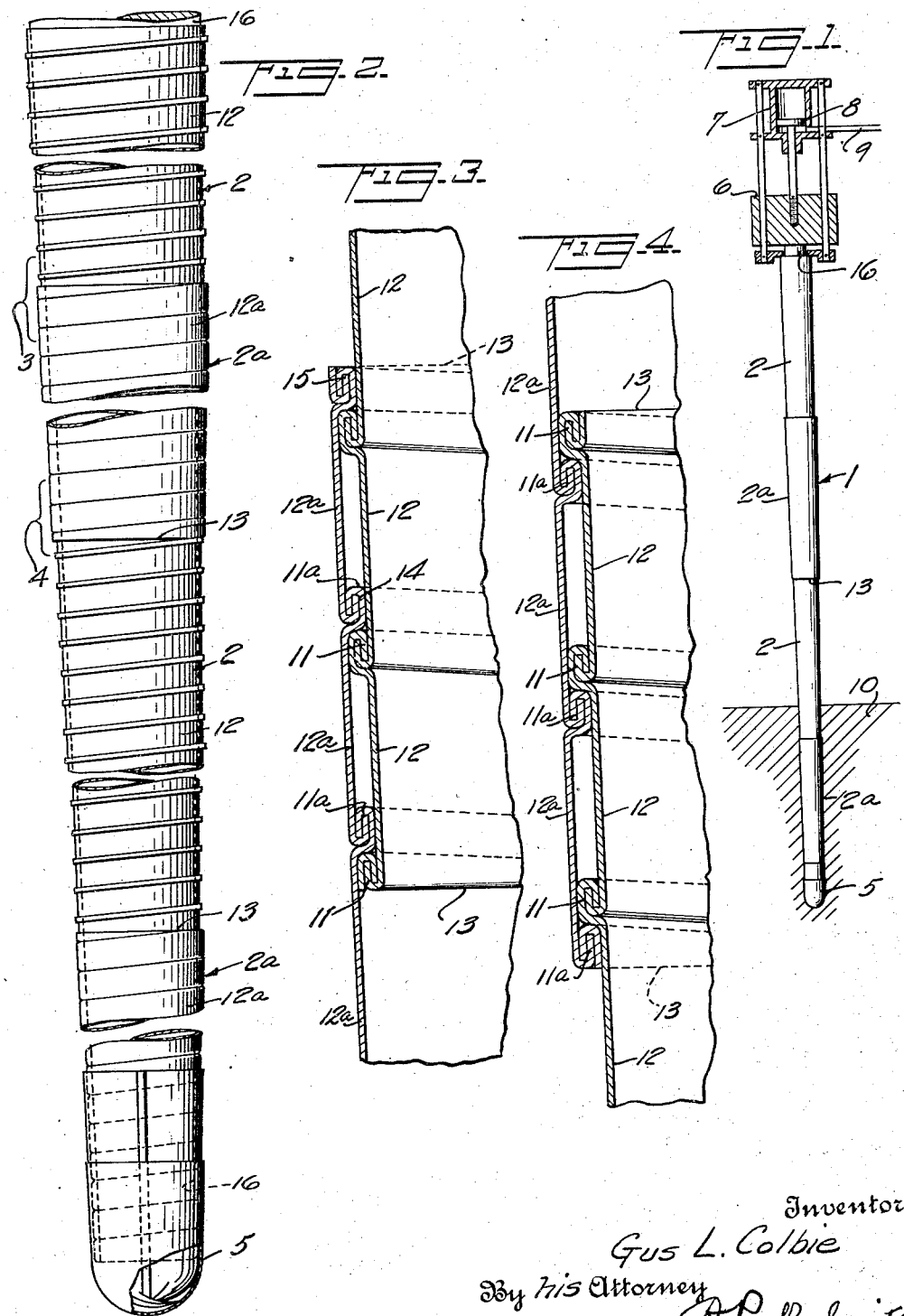

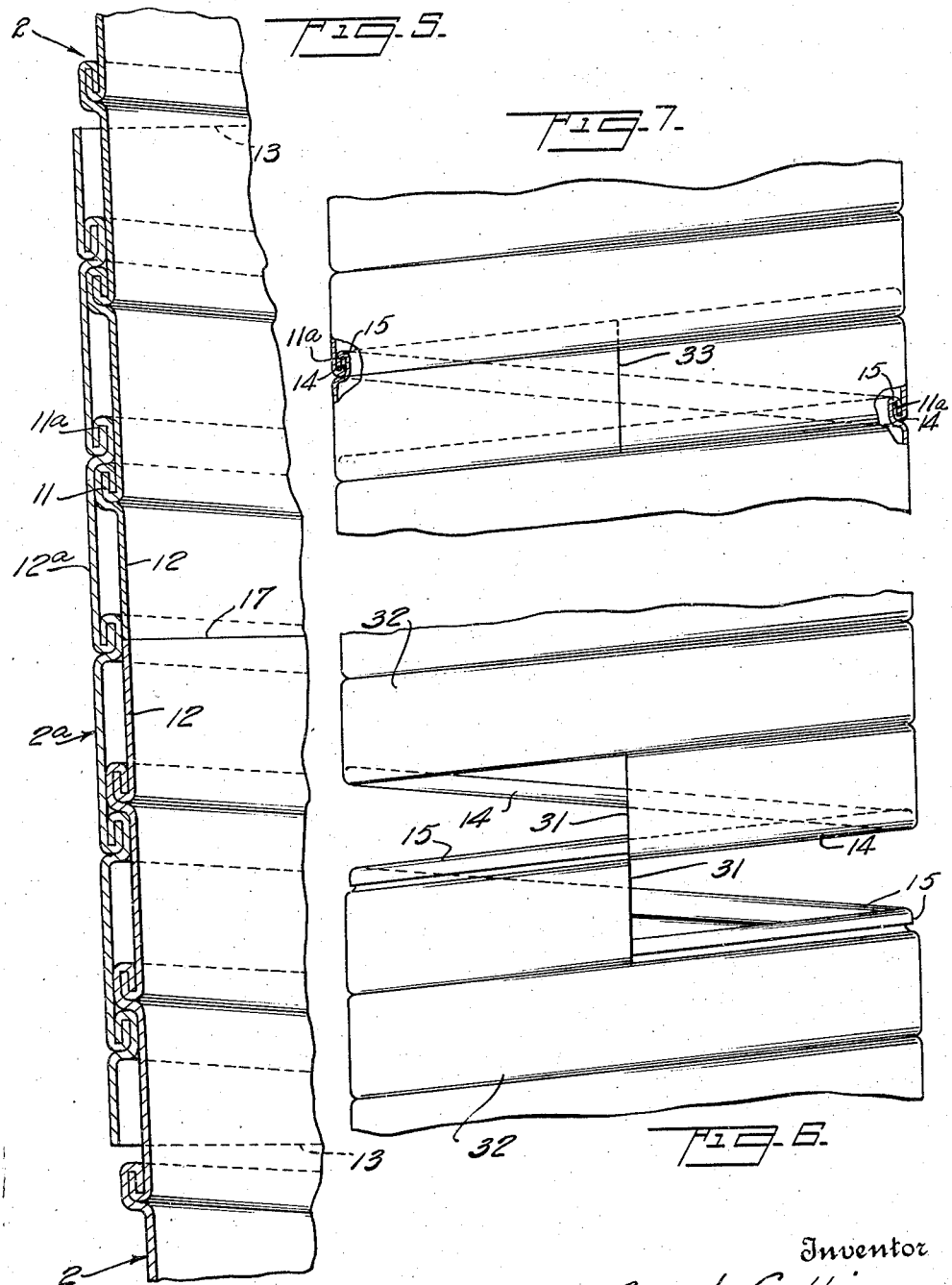

1,962,428

UNITED STATES PATENT OFFICE 1,962,428

SECTIONAL TUBULAR ARTICLE

Gus L. Colbie, Brooklyn, N. Y., assignor to F. MacGovern Corporation, New York, N. Y., a corporation of New York Application January 4, 1933, Serial No. 650,093

8 Claims. (Cl. 61—78)

This invention relates to strip-wound tubular articles such as piping, hollow metal piles, and similar structures, which, on account of their considerable length, or for other reasons, cannot or should not be made out of one strip of metal in the manner described in my co-pending application Serial No. 607,101, filed April 23, 1932; or which, for any reason, are preferably made up of tubular sections shorter than those usually produced by one continuous operation on such machine, said relatively short sections having to be coupled together in some way to produce the completed longer article.

More specifically stated, the preferred form of the present invention primarily relates to improved methods of connecting or coupling together such sections or lengths of strip-wound tubes by means of the rib shaped seams between adjacent edges of the strip convolutions. Two methods of accomplishing such result are hereinafter described, and perhaps others could be devised. When such sections are ordinarily made on the machine described in my above noted application, they have a helical or spiral rib formed on their inner or outer surfaces produced by the interlocking, folded edges of the strip forming the seam and the underlying idea of the first forms of the present invention consists in so varying the arrangement of the rolls in such machine in the production of different tubular sections that some of them will have such ribs offset and located on their outer surfaces, while others will have said ribs inset and located on their inner surfaces, and then so varying the diameter or diameters of the terminal portions of one such set with reference to the diameter or diameters of the terminal portions of the other set that the ends of members of one set can be tightly screwed into the ends of members of the other set with their oppositely disposed ribs forming interengaging screw threads each having the same pitch. In this way there will be produced a tubular structure of indefinite length composed of sections connected by substantially fluid tight joints without requiring the use of screws, bolts, welding or brazing apparatus, or other extraneous means or mechanism.

The preferred method of operation of the machine as described in my said co-pending application produced a tubular article of varying diameters at different points in its length. One form of article shown therein, and also in my companion application Serial No. 607,102, filed on the same date, was that of the frustrum of a cone, but obviously said machine could be adjusted to produce tubular sections each of a uniform diameter throughout, i. e. true cylinders, instead of other shapes. If certain of these cylindrical sections are made of slightly less diameter than others they can then have their ends slid into the ends of such other sections and the two screwed together as above described if the sections of smaller diameter have offset helical ribs and those of larger diameter have inset helical ribs. Thus a continuous line of piping could be formed of indefinite length and substantially uniform diameter. One set of such sections can also be made relatively short, and of a length just sufficient to serve as couplings, and the other set made of any desired length and assembled with their ends abutting, the said short sections serving as muff couplings or sleeve couplings to cover and join together the butt joints of the conduit sections proper.

Also, if tubular sections flaring in diameter at a uniform rate are produced, the smaller end of one section may be screwed into the larger end of the next section, and so on indefinitely, until the final section of minimum practical size is reached, the assembled sections then forming a continuous tube of substantially uniform taper.

Finally, according to the second embodiment of my present invention, if each section, whether of flaring or of cylindrical form, be built up from a single strip of metal without trimming its ends to lines or planes perpendicular to the axis of the tubular structure, but leaving each end of the spiral or helical strip intact and projecting, and with the exposed edge folds thereon in their original, only partly formed condition (as by spreading apart the seam closing rolls while each such terminal convolution is being curved to the desired radius), the single, half-seam convolution thus left protruding from the opposite ends of each such tubular section can be engaged by a complementary, exposed, half-seam convolution on an adjacent tubular section, and a joint between such tubular sections then formed by screwing these complementary, exposed convolutions one into the other until the ends of the strips come together.

Specimen joint constructions of certain of the varieties above generally outlined are shown in the accompanying two sheets of drawings, in which Fig. 1 is a side elevation of a completed pile made according to the first form of my present invention partly driven in position, with the steam hammer shown in section.

Fig. 2 is an enlarged side view of such pile with parts broken away.

Fig. 3 is a detail, longitudinal section of the pile wall taken about the point indicated by the bracket 3 in Fig. 2.

Fig. 4 is a similar section taken about the point indicated by the bracket 4 in Fig. 2.

Fig. 5 is a similar section showing a modified form of joint coupling, of the same type.

Fig. 6 is a side view of the adjacent ends of two pile or pipe sections having end convolutions of half-seam form, adapted to screw one into the other and form a single completed seam convolution, thus producing another type of joint according to the second embodiment of the invention, and Fig. 7 is a side view of a joint so formed, parts thereof being shown in section.

Throughout the drawings like reference characters indicate like parts. Referring to Fig. 1, a tapered metal pile is generally indicated at 1 as being driven into the ground 10 by a pile driver of conventional form comprising a heavy weight or hammer 6 alternately raised and dropped by the intermittent action of steam or compressed air on piston 8 in cylinder 7, such pressure fluid being supplied through a pipe 9. Usually such a hollow pile has a tip member 5, mounted on its lower end and has a mandril 16 set in its interior to absorb the shock of the pile driver, said mandril being withdrawn after the pile has been driven far enough and a plastic cement filling poured into the pile interior, and allowed to set. The pile shown is composed of two sets of tubular sections the members of which are respectively marked 2 and 2a, the former each being of a lesser diameter at its ends than are the adjacent ends of the adjacent sections 2a, 2a, so that each said section 2 can be part way telescoped one into the other of members of the 2a set.

The details of construction of sections 2 and 2a are shown on enlarged scales in Figs. 2, 3 and 4. Each is built up out of a spirally wound metal strip 12, or 12a, the edges of the adjacent convolutions of which have been folded in opposite directions and interlocked and crimped together to form a continuous spiral rib 11 or 11a in the manner described in my first above noted copending application. The ribs 11, on the tube sections 12 are offset, i. e. project from the exterior of the tube, while the ribs 11a on the sections 12a of slightly larger diameter are inset, i. e. project from the interior surface of the tube. The use of different seam forming dies will produce this difference between offsetting and insetting. Fig. 3 shows the joint at the larger end of a tube section 2a, as indicated by the bracket 3 in Fig. 2, while Fig. 4 shows the joint at the smaller end of the same section, as indicated by bracket 4 in Fig. 2.

If a single metal strip were obtainable of a length sufficient to form an entire pile or pipe structure, it could be built up at one operation on the machine referred to (with the exception of cap 5) but if the pile were 45 feet in length and had an average diameter of one foot, a 4 inch strip about 600 feet long would be needed to form it, (assuming that the effective width of the strip was only 3 inches, after its edges had been folded over to form the seam) and strips of that length might not be easily obtainable from the mills. Also such full length pile made in the shop would be awkward to handle and transport, so that it is preferable, if not necessary, to make each pile in sections and to join these sections together on the job before or during the operation of driving the pile into the ground. Each section can then be made from a strip of metal of some standard length and width which can be supplied by the mill from stock. If 50 foot strips were used, a 45 foot pile of the diameter assumed would then be composed of about 12 separate sections each of about 4 feet length. These could be made in the shop separately, easily transported to the job location and there joined one to another before the pile is driven, or progressively while said driving is performed in successive stages.

It is obvious that the interlocked, crimped together edges of the strip 12, or 12a, form a spiral rib on a tapering tube, or a helical rib on a cylindrical tube, and that such rib can be made to project entirely on one side of the main body of a strip by properly designing the seam-forming dies or rolls as above suggested. Consequently the spiral or helical seam rib can be made to lie either on the inside or on the outside of the tubular structure formed out of the strip.

The spiral or helical ribs thus formed will then produce internal or external threads and if the terminal diameters of sections composed of strips 12, 12, (equipped with external threads 11, 11, when looking at Figs. 3 and 4) are made sufficiently smaller than those of adjacent sections 2a, 2a, formed of strips 12a, 12a, and having internal rib threads 11a, 11a, such section ends can be screwed one into another as shown in Figs. 3 and 4. In this way, a tight joint is formed without the use of rivets, bolts or welding or brazing operations, and such joints, if composed of sections screwed one into the other to a distance approximating the diameter of the telescoping tube ends, will present a greater stiffness and resistance to stresses tending to buckle the structure than will other portions thereof.

If each of the sections of tubing 2 and 2a is wound up from a strip of a definite length the ends of each strip will project at the ends of the tube as indicated in Fig. 6, where 31, 31, are the ends of strips 32, 32, which have been wound up to form cylindrical sections of the type 2a, i. e. those having the helical ribs 11a in their interiors. The seams are all formed by interlocking oppositely folded edges of the strip, the cross section of one fold forming a straight hook 14, while the cross section of the other edge shows an offset or inset hook form 15.

One end of each such section (the upper end as shown in Fig. 7) will have one convolution of an offset or inset hook edge 15 exposed, and the other end will have one convolution of a straight hook edge 14 exposed. Tube sections having projecting ends of this character can be made in the two types 2, and 2a, as before described, and screwed one into another as already explained.

According to the second embodiment of my present invention, however, the section ends to be joined may be made of equal diameters, and, as these initial and final convolutions of each section have not been gripped by the seam locking rolls (if the closing movements of the latter are limited) the ends of the two hooked strip edges of adjacent tubular section can be initially interengaged as indicated in Fig. 6, and then the two tubular sections can be screwed together to the extent of one complete revolution of one tubular section relative to the other, until the ends 31, 31, meet as indicated at 33 in Fig. 7, thus forming a joint continuous with, and similar to, that running around the remainder of the assembled tubular structure, except that one convolution of the helical rib joint, as 11a (that shown in cross section at two points in Fig. 7) will not have had its interhooked edges clamped together by pressure of the seam locking rolls exerted radially of the tube. The same thing could be done with the offset rib type of structure shown at 11 in Figs. 3 and 4. The resulting product in the first case would be a continuous tube of uniform diameter and indefinite length having joints such as shown in Fig. 7. The product in the other case would have a continuous exterior rib. The seam-forming dies or rolls also might be so shaped that the resulting rib seam would be symmetrically disposed with reference to the medial lines of the flat portion of the strips forming the major portion of the tube walls.

The same procedure could be followed with tapered tubular sections, if their diametrical dimensions were so adjusted that the smaller end of each section would screw into the larger end of another section in this way.

If, however, the sections 2, 2a, are (for any reason) to be each shorter than the length of tube which is produced by winding up a complete strip as received from the mill, then such originally produced tube of greater length must be trimmed down into sections of the desired length by sawing it transversely, thus producing sections having circular, even ends 13, 13, as shown in Figs. 1 to 4. If desired, butt joints between sections of either type, as 2, can be obtained by making the other sections 2a much shorter, as shown in Fig. 5, so that the latter merely become muff couplings surrounding each butt joint 17.

Both these butt joints with muff coupling members, interiorly or exteriorly placed, and simple telescoping screw joints like those shown in Figs. 3 and 4, could also be made out of sections having a projecting, unlocked half seam convolution at each end (such as shown in Fig. 6) if the sections of either type were (as above explained) divided into two classes, the members of one of which would have offset rib seams and terminal diameters slightly less than those of adjacent members of the other class which would have inset rib seams,—the members of the two classes of sections alternating one with another in the assembly. A neater job is obtained, however, if the section ends are sawed off evenly as at 13 and 17 in Figs. 2 to 5.

The different types of rib seams, i. e. the offset type 11, or the inset type 11a, can be produced with the same set of seam forming rolls, if the bending rolls are so set as to curve the assembled seam to one side or the other of the straight line along which the strip is fed to them from the seam forming rolls.

By the use of the above described principles of my invention water and gas pipe and cylindrical piles can be made up from cylindrical sections such as shown in Figs. 5, 6 and 7 and tapered piles can be made out of tapering sections such as shown in Figs. 1 to 4, the tubular sections being made in the shop, carried to the place of use, and there screwed together with a pipe wrench.

If desired, the sections of a pile protruding above the ground, or some of the sunken sections could be of the cylindrical instead of tapered type. The completed pile may be filled with concrete as before stated. Butt joints like that shown in Fig. 5 can be used, or even the modified joint shown in Fig. 7 could be used, in piles as well as in pipes. The telescoping tapered joint shown in Figs. 2, 3 and 4 would be the most nearly water-tight because one tapered end section can be wedged into the other until the opposing inner and outer surfaces are pressed together with great force.

Various changes could be made in the details of construction shown without departing from the underlying principles of the invention as herein explained. Thus other forms of interlocking seams could be used, and the ribs thereby produced might be variously disposed with reference to the medial lines of the section walls, instead of some being completely inset and the others completely offset, therefrom, as here shown.

Having described my invention, I claim:

1. A tubular structure comprising in combination a plurality of sections each composed of a strip of material wound into successive convolutions joined together by a continuous seam formed by interlocking the adjacent edges of the strip to form a rib, one of said sections being of slightly smaller diameter than the other and having said rib located on its exterior surface, while the other section has such rib located on its interior surface, the ends of said sections being telescoped one into another so that said oppositely extending ribs are screwed together.

2. A structure such as defined in claim 1 in which said plurality of sections is composed of two classes, the ribs of all sections of one class having the ribs located on their exterior surface while those of the other class have the ribs located on their interior surface.

3. A structure such as defined in claim 1 in which said plurality of sections is composed of two classes, the ribs of all sections of one class having the ribs located on their exterior surface while those of the other class have the ribs located on their interior surface with sections of one class having their ends abutting one against another.

4. A tubular structure comprising in combination, a plurality of sections each composed of a strip of material wound into successive convolutions and joined together by a continuous seam formed by bending the adjacent edges of the strip into folds of oppositely disposed hook shaped cross sections producing continuous ribs, the end portions of the rib on each section intermeshing with the end portion of the rib on an adjacent section to form a joint connecting said sections together.

5. A structure such as defined in claim 4 in which that edge of the end portion of the strip composing one section which is folded to form a hook opening in one direction intermeshes with that edge of the end portion of the strip composing an adjacent section which is folded to form a hook opening in the opposite direction.

6. A structure such as defined in claim 4 in which that edge of the end portion of the strip composing one section which is folded to form a hook opening in one direction intermeshes with that edge of the end portion of the strip composing an adjacent section which is folded to form a hook opening in the opposite direction, the free ends of said strips abutting one against the other.

7. As a new article of manufacture, a hollow tapered pile section formed of a metal strip wound into spiral convolutions, the adjacent edges of said strip convolutions being folded in opposite directions so as to interlock and form ribbed seams which strengthen the pile walls in addition to holding the successive strip convolutions together.

8. A hollow, tapered pile, or similar article comprising, in combination, a plurality of progressively tapering tubular sections each composed of a strip of material wound into spiral convolutions joined together by a continuous seam formed by interlocking the adjacent edges of the said convolutions to form a spiral rib-shaped seam, said sections being divided into two classes, the members of one class having such ribs located on their interior surfaces, and said sections screwed together and so graded in terminal diameter that the ends of each externally ribbed section are screwed into the adjacent ends of two internally ribbed sections of the other class.

GUS L. COLBIE.